(12) United States Patent
Ferguson et al.

(10) Patent No.: US 6,179,121 B1
(45) Date of Patent: Jan. 30, 2001

(54) DEVICE FOR TRANSPORT AND SPLAYED DISPLAY OF MEDIA

(75) Inventors: Josh W. Ferguson; Matthew Rohrbach, both of San Francisco, CA (US)

(73) Assignee: Speculative Incorporated, Palo Alto, CA (US)

( * ) Notice: Under 35 U.S.C. 154(b), the term of this patent shall be extended for 0 days.

(21) Appl. No.: 09/369,667

(22) Filed: Aug. 5, 1999

Related U.S. Application Data

(60) Provisional application No. 60/095,402, filed on Aug. 5, 1998, and provisional application No. 60/104,457, filed on Oct. 16, 1998.

(51) Int. Cl.[7] .................................................. B65D 85/57
(52) U.S. Cl. ..................... 206/311; 206/308.1; 206/425
(58) Field of Search ............................. 206/308.1, 309, 206/311, 425, 748

(56) References Cited

U.S. PATENT DOCUMENTS

| | | | |
|---|---|---|---|
| 453,664 | 6/1891 | Runyon . | |
| 660,541 | * 10/1900 | Field ................................. | 206/425 X |
| 1,000,880 | * 8/1911 | Anderson ............................. | 206/748 |
| 1,005,403 | * 10/1911 | Zoerb ................................. | 206/425 |
| 1,336,293 | 4/1920 | Grammich . | |
| 1,339,194 | 5/1920 | Grammich . | |
| 1,480,860 | 1/1924 | Ness . | |
| 2,261,806 | * 11/1941 | Hills ................................... | 206/309 |
| 2,323,245 | * 6/1943 | Schenker ............................ | 206/311 |
| 3,823,814 | 7/1974 | Lum . | |
| 4,488,645 | 12/1984 | Yamaguchi . | |
| 4,538,730 | 9/1985 | Wu . | |
| 4,730,727 | * 3/1988 | Petroff ................................. | 206/311 |
| 4,778,047 | * 10/1988 | Lay .................................... | 206/311 X |
| 4,798,284 | 1/1989 | Wakelin . | |
| 4,844,260 | 7/1989 | Jaw . | |
| 5,180,058 | * 1/1993 | Hu ..................................... | 206/308.1 X |
| 5,446,953 | 9/1995 | LeFeber . | |
| 5,501,326 | 3/1996 | Shuhsiang . | |
| 5,669,491 | 9/1997 | Pettey . | |
| 5,727,681 | 3/1998 | Li . | |
| 5,749,464 | * 5/1998 | Cheris et al. ..................... | 206/308.1 |

\* cited by examiner

*Primary Examiner*—Bryon P. Gehman
(74) *Attorney, Agent, or Firm*—George C. Limbach

(57) ABSTRACT

A removable storage media case is described with a series of base segments each with a fin separation or an end-fin and with plastic flexures permitting segments to rotate with respect to each other and a retaining band. The base segments become successively shorter moving away from the center of the case.

19 Claims, 18 Drawing Sheets

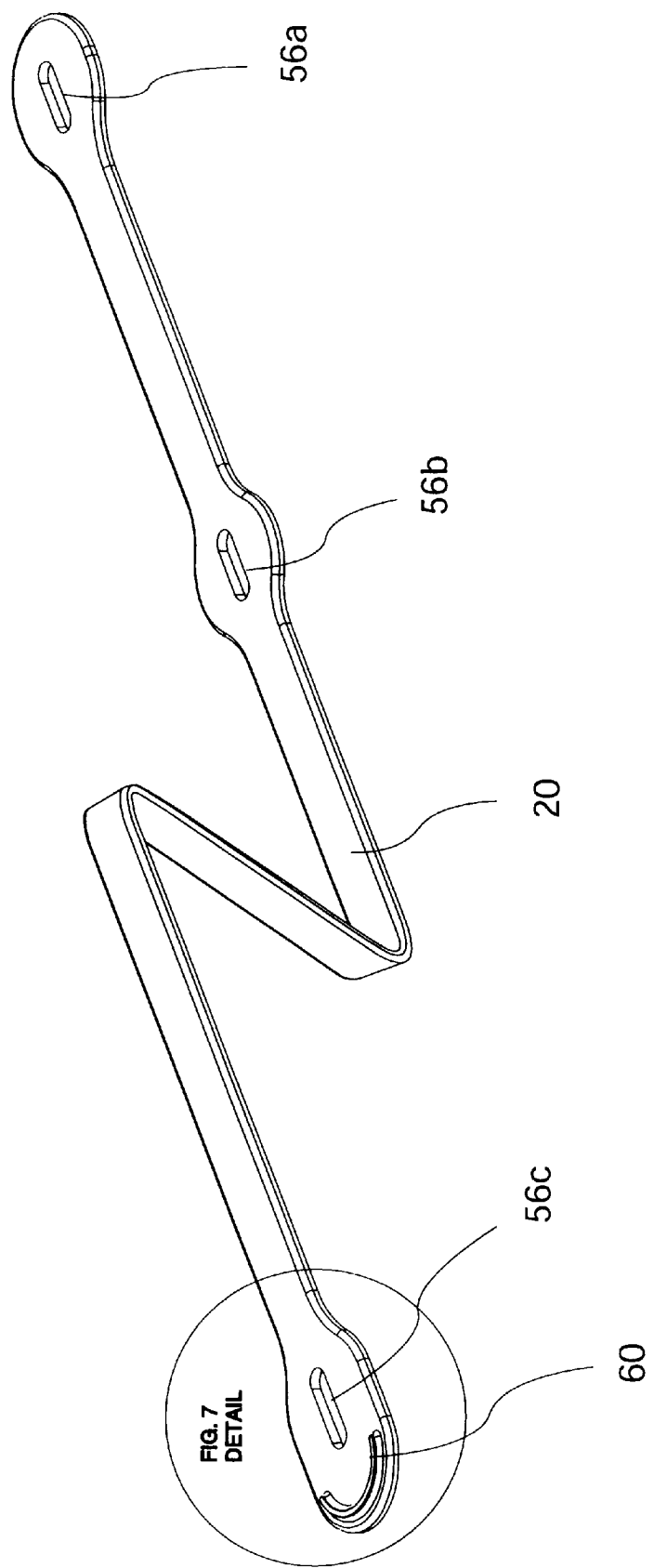

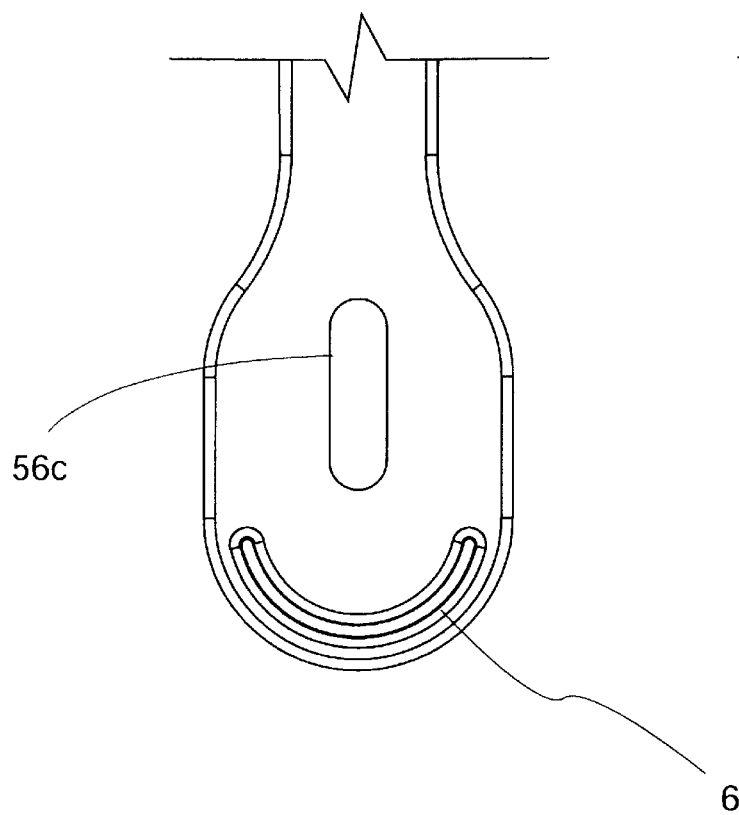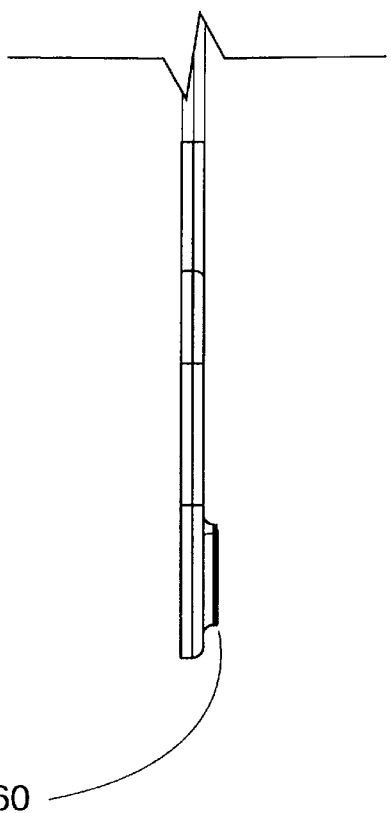

DEVICE FOR TRANSPORT AND SPLAYED DISPLAY OF MEDIA

CROSS-REFERENCES TO RELATED APPLICATIONS

This application claims the benefit of Provisional Patent Application Ser. No. 60/095,402, filed Aug. 5, 1998, and Provisional Patent Application Ser. No. 60/104,457, filed Oct. 16, 1998.

BACKGROUND OF THE INVENTION

Definitions

Removable storage media is defined as any of a number of devices that store digital information for potential playback, re-use, or re-recording. Examples of removable storage media are any rotating media without a permanently connected protective shell housing such as compact disks (CDs), recordable compact disks (CD-R), re-writable compact disks (CD-W), or digital video disks (DVDs). Removable storage media is defined to also include cartridge-format devices, which are systems where rotating or non-rotating media is permanently contained within a protective shell housing. Examples include floppy disks, Zip disks, and Jaz disks. Non-rotating systems include such as devices as digital audiotapes (DAT).

Removable media case is defined as a protective, reusable container in which removable storage media is usually sold, often referred to as a "jewel case." Removable media cases are usually made of molded plastic, some large majority of which is transparent so that the user may observe the presence of the media, or a descriptive or decorative label.

BACKGROUND OF THE INVENTION

Removable storage media for computer applications, audio, and video playback is a rapidly growing product category, and are used for a variety of purposes. For example, because computers are known to "crash" periodically, that is, to cease functioning unexpectedly, and subsequently lose or corrupt data, users frequently have the need to back up important information on a medium other than the hard drive of their computer. Many removable media storage alternatives are currently available on the market. These include: floppy disks, HiFD (high-density floppy disks), DAT (digital audio tape), CDR (writable compact discs), optical discs, cartridge-format solutions such as the Zip, Jazz, and Ditto cartridges manufactured by Iomega of Roy, Utah, and the Superdisk manufactured by Imation of Oakdale, Minn. Because of their inherent portability, removable storage media also provide a convenient and efficient means for transferring files between users or from one location of use to another. In many cases, transporting files in a physical medium such as these circumvents problems posed by attempting to send them electronically. For instance, companies commonly set up their computer server in such a way as to limit the size of files being sent or received. The amount of time required to upload or download large files can also be a significant problem, as the computer remains unusable in the interim. Furthermore, the use of compression utilities to reduce the size of files being sent can cause data corruption. As the computing industry grows, the increasing use of removable storage media underscores the need for a means to transport and display multiple removable media storage devices.

Aside from computing applications, one sees equivalent needs for transporting removable storage media in the audio and video realms. The audio CD media format has replaced virtually all other audio storage and playback formats. Today one commonly finds CD players in homes, offices, and automobiles. Portable CD players are commonly used by people traveling, commuting, or engaging in sports. The emergence of new compact media standards such as CDR and DVD (digital videodisc) ensures further need for transporting removable storage media. The proliferation of computers into the home, as well as the widespread adoption of new technologies such as compressed audio file formats, and digital still and movie cameras, is increasing the production of large data files that users want to store indefinitely for future access. As applications for removable storage media continue to grow, the need to transport media will accordingly increase. However, the need to transport media devices brings about data protection issues and underscores the need for a safe method for transporting them. At the same time, the means for transport ideally should not impede easy access to any of the media devices contained therein. Current art is biased in favor of either displaying media for access or in favor of protecting it for transport. What is needed is a means to securely transport a number of removable media in their original jewel cases, but with the ability to quickly view and access the individual cases.

U.S. Pat. No. 5,180,058 to Hu (1993) is an example of a device that partially addresses this need. Hu discloses a disc holder assembly comprised of front and back cartridges and one or more intermediate cartridges detachably and pivotally secured to the front and back cartridges or to each other. This assembly permits the insertion into or removal from each intermediate cartridge of a floppy diskette or compact disc when the assembly is pivoted into an open position. However, the design of this assembly provides no means for automatically splaying the enclosed contents for increased access, which means the entire assembly must be handled to open a cartridge and extract a disc. Conversely, the design incorporates no means for positively latching the assembly shut for transport, and instead relies upon a plastically deformable detente mechanism to achieve this end. The problem with this design is that the assembly may inadvertently open during transport and thereby expose the contents to the possibility of being damaged. Furthermore, the design disclosed by Hu does not allow a user to remove media with its corresponding protective case. Instead, any media removed from the assembly is unprotected, thereby presenting a problem when a user has a need to separate the enclosed media. This device also offers a problematic solution for the labeling of the media it contains. The top-most surface of each cartridge offers only a small fraction of the surface area for labeling, while the rest of the surface is characterized by lateral grooves which aid in opening the device for content display or access. Using the labeling sleeve from a common compact disc case would result in the labeling spine residing on the underside of the assembly, opposite the side of access. Finally, the assembly disclosed by Hu comprises many separate and interlocking pieces (always one piece more than the number of disks contained), leading to high manufacturing and assembly costs. At the same time, this complexity would likely make the assembly more prone to malfunction.

U.S. Pat. No. 5,727,681 to Li (1998), U.S. Pat. No. 4,844,260 to Jaw (1989), and U.S. Pat. No. 4,538,730 to Wu (1985) all exhibit some form of splaying action to facilitate the viewing and access of the media they contain. However, in each of these inventions, the device offers no benefit of a tapered lead-in to facilitate placement of media into the device. Although the media bays splay open, offering a tapered space between each media slot, the actual media-locating features do not reap any benefit from this geometry, as they remain dimensionally constant. For instance, in the case of U.S. Pat. No. 5,727,681 to Li, the elastically deformable holding element requires a pressure fit for media insertion, even when the device is splayed. Similarly, Jaw and Wu disclose devices in which the media-retaining bags retain their slender profile regardless of the splay action which the assemblies experience when opened. Furthermore, each of these designs has a similar shortcoming in terms of data protection. Specifically, when any of these devices are splayed into their open configurations, the contained media are directly exposed. Leaving these assemblies in their open positions is therefore undesirable, as the media are exposed to dust and the possibility of being scratched. As a result, the convenience and accessibility offered when these devices are in their splayed configurations is counterpoised by the resulting compromise in media protection. Furthermore, none of these devices allow a user to extract media without forfeiting its protective case. This can be problematic, such as when a user needs to transfer a portion of the contained media to another person. None of these devices provide space for labeling the media contained, nor do they provide space for transferring the label sheet from other removable storage media cases. When these devices are closed for protection or transport purposes, a user cannot view the enclosed media. Therefore, users must open these devices to determine whether the media they need is contained within. Finally, each of these devices is composed of many individual parts, again meaning greater costs in manufacturing and assembly.

Objects and Advantages

The objects of the present invention are:

to provide a transport and display device for removable storage media which offers maximum display and accessibility of media while also providing maximum portability in a secure fashion;

to provide a transport and display device for media which automatically splays open to present the contained media when a retaining strap is unfastened;

to provide a transport and display device for media which splays open far enough so as to provide grasping space for fingers;

to provide a transport and display device for media which offers the benefit of a tapered lead-in for increased ease of placing media into the device;

to provide a transport and display device for media which protects the contained media in both the open and closed configurations, by benefit of being able to keep the removable storage media in their respective removable storage media cases;

to provide a transport and display device for media which allows the use of original removable media cases, thereby providing for the flexibility of removing a media disk with its protective container and accompanying label;

to provide a transport and display device for media which allows a user to extract desired media without needing to handle the whole assembly;

to provide a transport and display device for media which may be collapsed so as to align the enclosed media in a substantially parallel fashion, thereby minimizing the space it consumes;

to provide a transport and display device for media with a means for positively securing the unit shut for transport;

to provide a transport and display device for media which allows a user to easily view the contents when the device is in the closed, transport configuration;

to provide a transport and display device for media with a minimal number of parts, and thus with the advantages of reduced material use and low manufacturing and assembly costs; and to provide a transport and display device for media characterized by a design which may easily be adapted to suit different numbers of media devices or to suit new removable storage media formats as they become available.

The present invention provides for a device that can securely contain a plurality of removable storage media, each stowed in their respective removable media cases, in a stacked, space efficient format. The device can also transform into a display mode so that the removable storage media, in their removable media cases, are presented in a splayed configuration, for easy visual inspection and graspable access by the user.

One aspect of the present invention is a removable storage media transport and display device with a plurality of base segments connected by flexible integral hinges, each of the base segments having an upright separating fin; a plurality of removable storage media placed on the base segments against and separated by the fins; a retaining band connected to the base segments for automatically rotating the base segments and thus the removable storage media in a splayed format, and for alternately retaining the base segments and removable media in a compressed format.

Another aspect of the present invention is a removable storage media transport and display device with a plurality of slots for accepting removable storage media, the slots being capable of expanding at the top for the purpose of placing the removable storage media into the slots, and the slots also being capable of contracting to compress a plurality of removable storage media so they are held close to one another; a means for automatically expanding the transport and display device into a splayed format and a means for retaining the transport and display device in a physically compressed format with media close together and parallel.

Other objects and advantages of the present invention and a full understanding thereof may be had by referring to the following detailed description and claims taken together with the accompanying illustrations. The illustrations are described below in which like parts are given like reference numerals in each of the drawings.

BRIEF DESCRIPTION OF THE DRAWINGS

FIG. 6 is an isometric view of the retaining band 20.

FIGS. 7a and 7b are orthographic cutaway detail views of the retaining slot end 56c of the retaining band 20.

PREFERRED EMBODIMENT

First, the components of media transport device 10 will be described, then the operation. In the preferred and alternative embodiments, removable storage media 22a–f refers to the assembly comprised of removable storage cartridges or removable storage disks that are stored inside removable media cases, often referred to as "jewel" cases. Removable storage cartridges include devices such as Zip cartridges manufactured by Iomega of Roy, Utah. Removable storage disks include items such as recordable compact disks (CD-R) manufactured by Maxell Corporation of America, of Fairlawn, N.J., among others. Removable media cartridges or removable media disks will not be described in detail here as they are well known in the art of removable storage case design.

Figure 1:
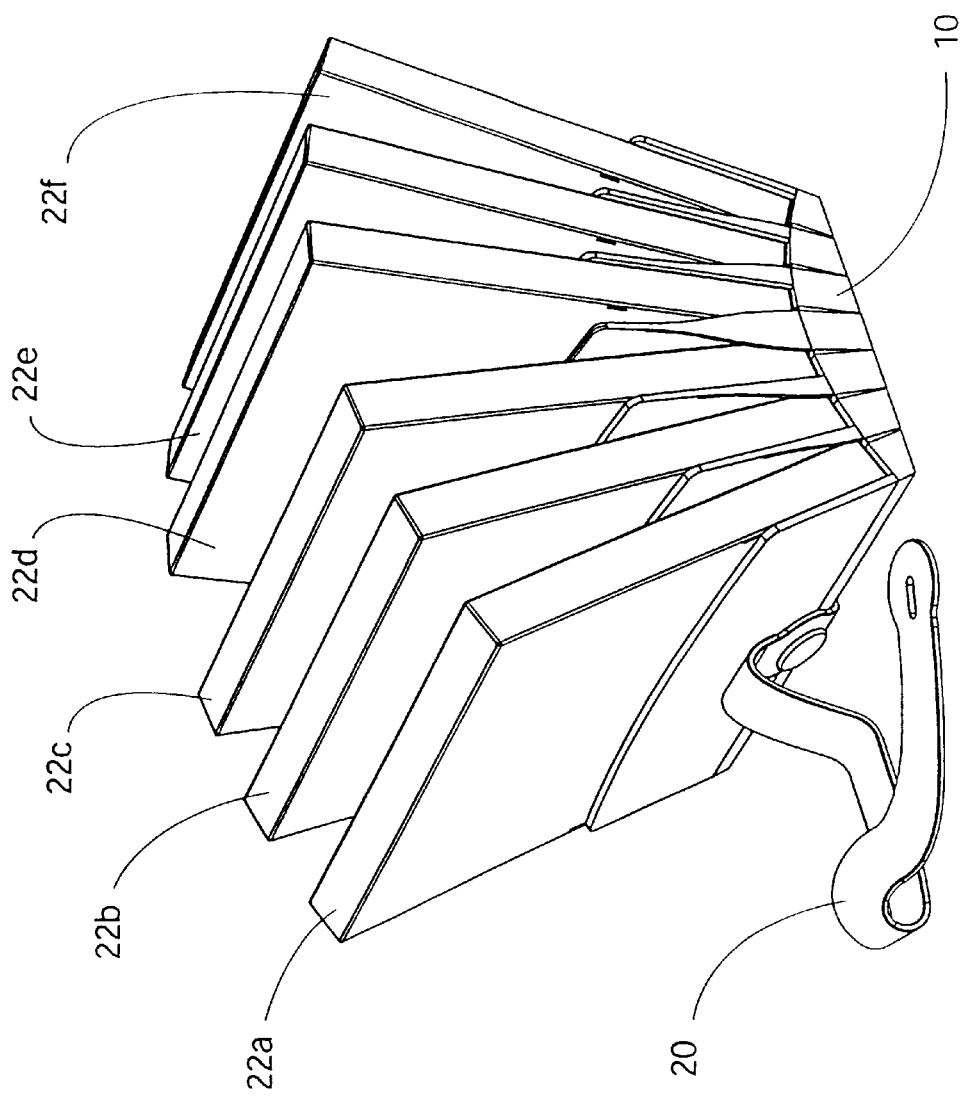
FIG. 1 is a top isometric view of removable storage media transport and display device 10 in the splayed presentation mode.
Figure 2:
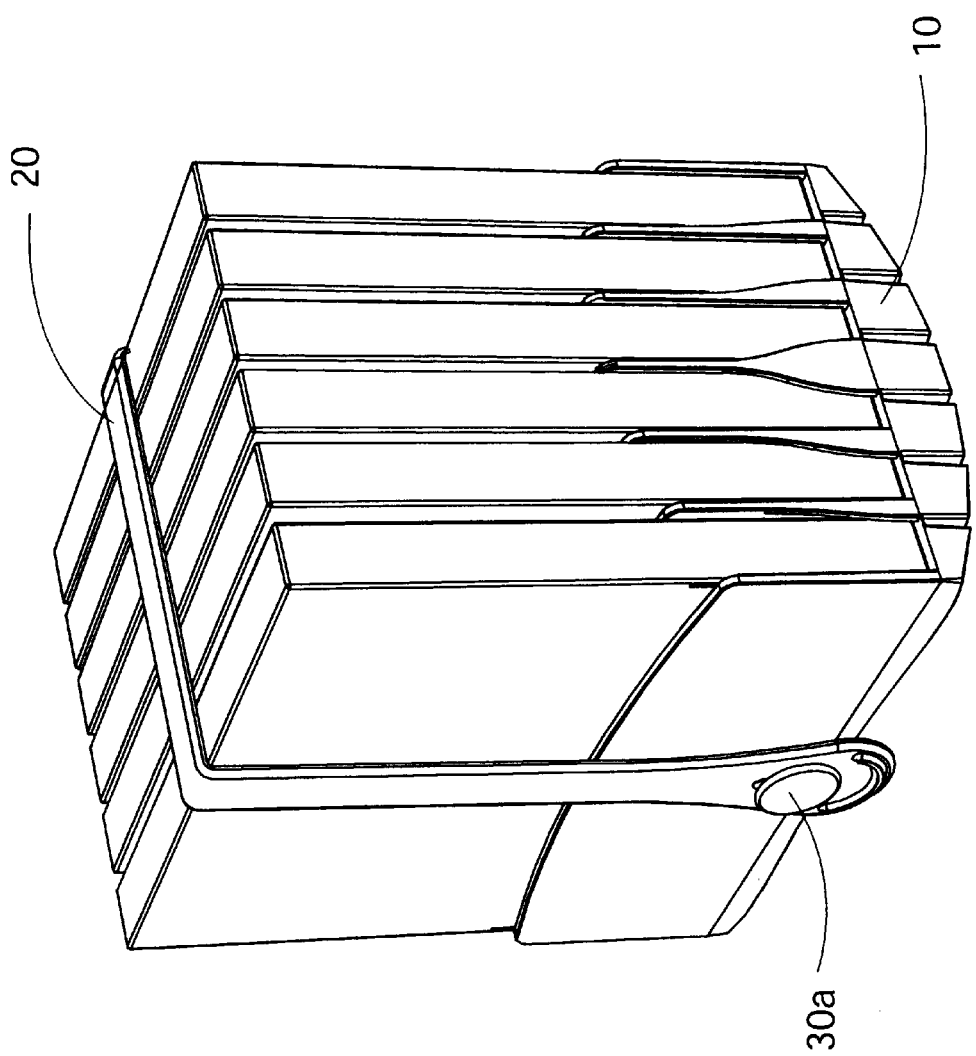
FIG. 2 shows a view of media transport device 10 in transport mode, with the retaining band 20 binding the device in the closed configuration.
Figure 3:
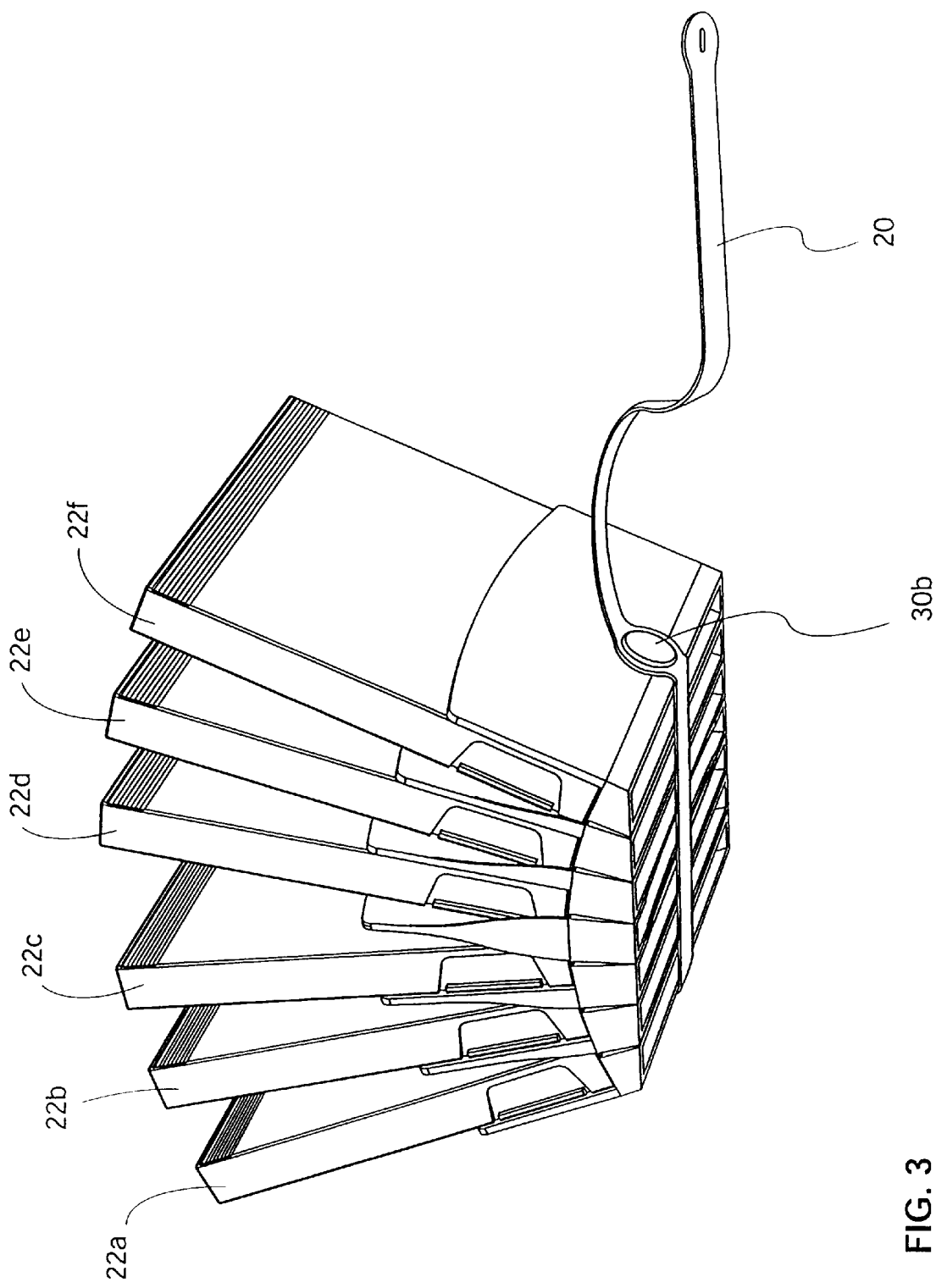
FIG. 3 is a view from below of media transport device 10 in the open display mode.
Figure 4:
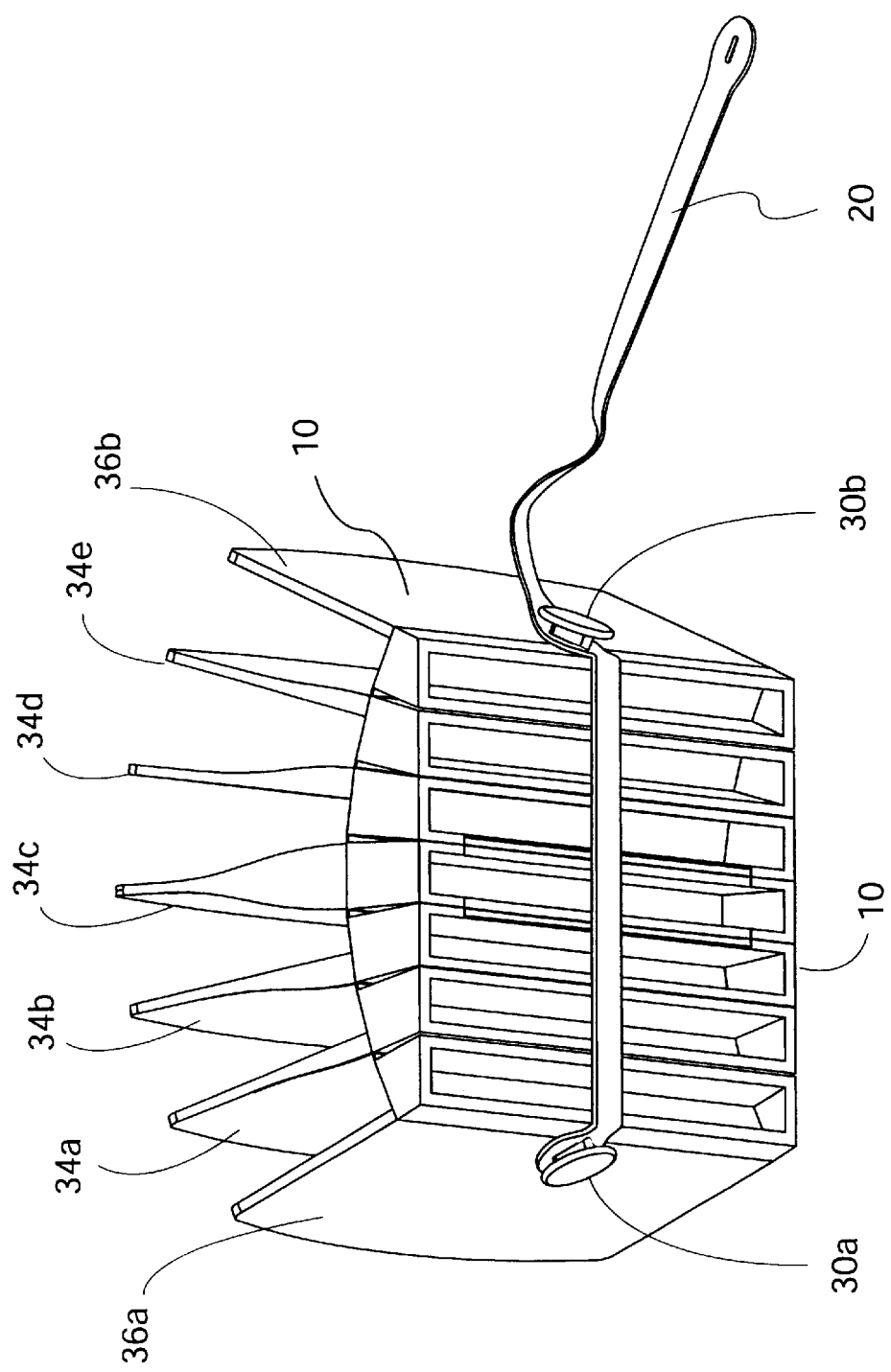
FIG. 4 is a view from below of media transport device 10 in display mode, showing both band retaining buttons 30a–b.
Figure 5:
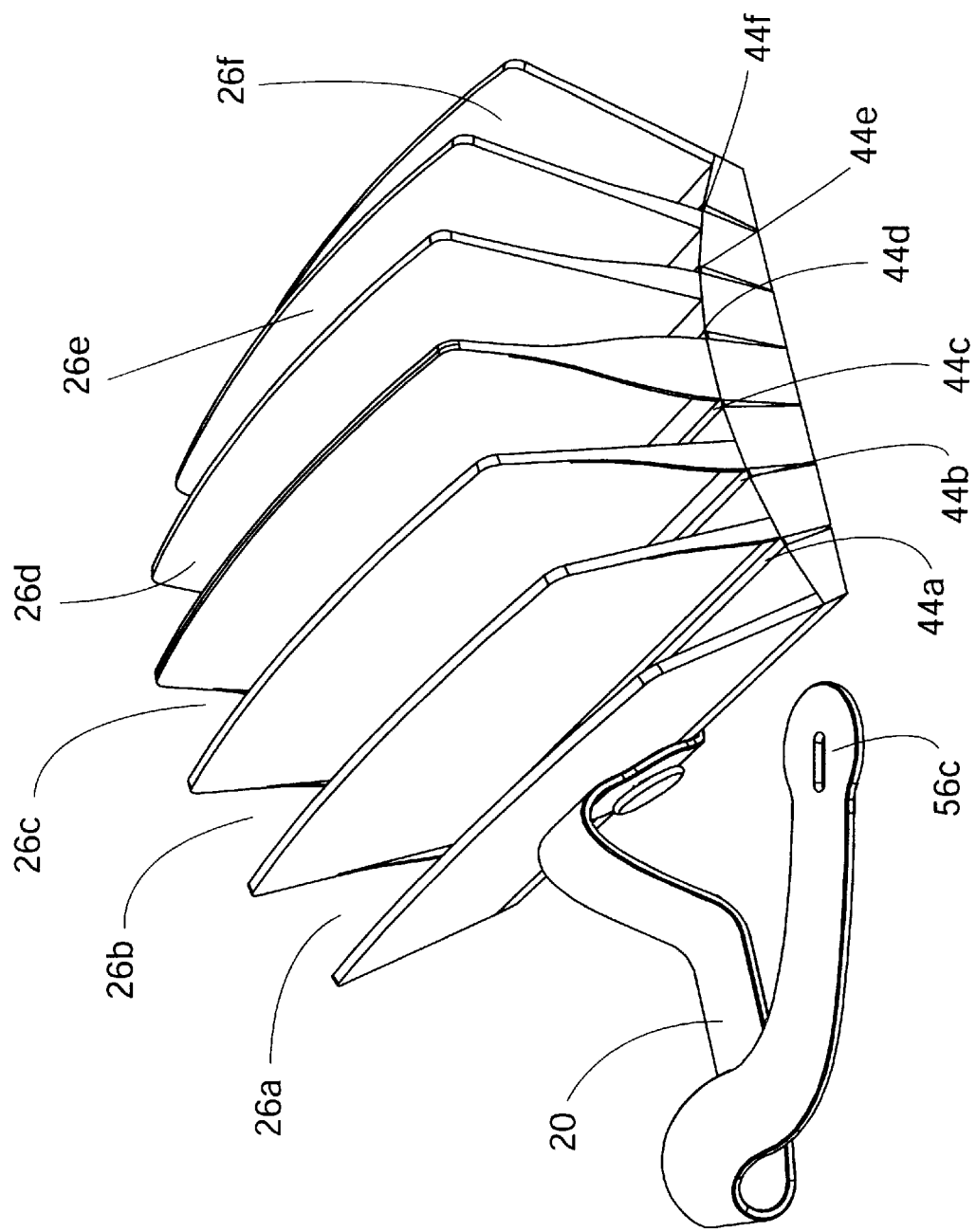
FIG. 5 is an isometric view of media transport and display device 10 in the splayed configuration but without removable storage media 22a–f installed.
Figure 8:
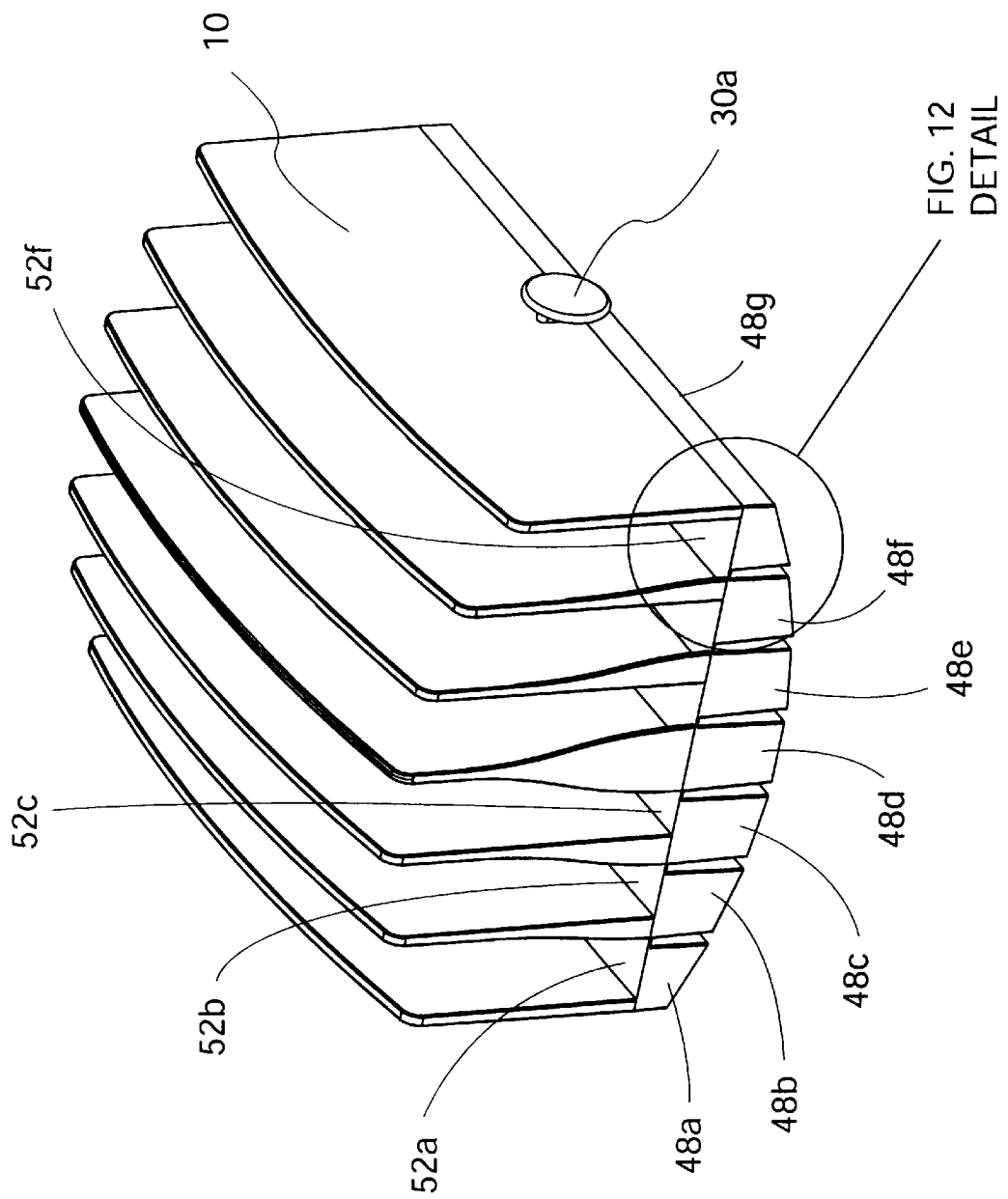
FIG. 8 is an isometric view of media transport and display device 10, in the unsplayed configuration, without removable storage media 22a–f installed.
Figure 9:
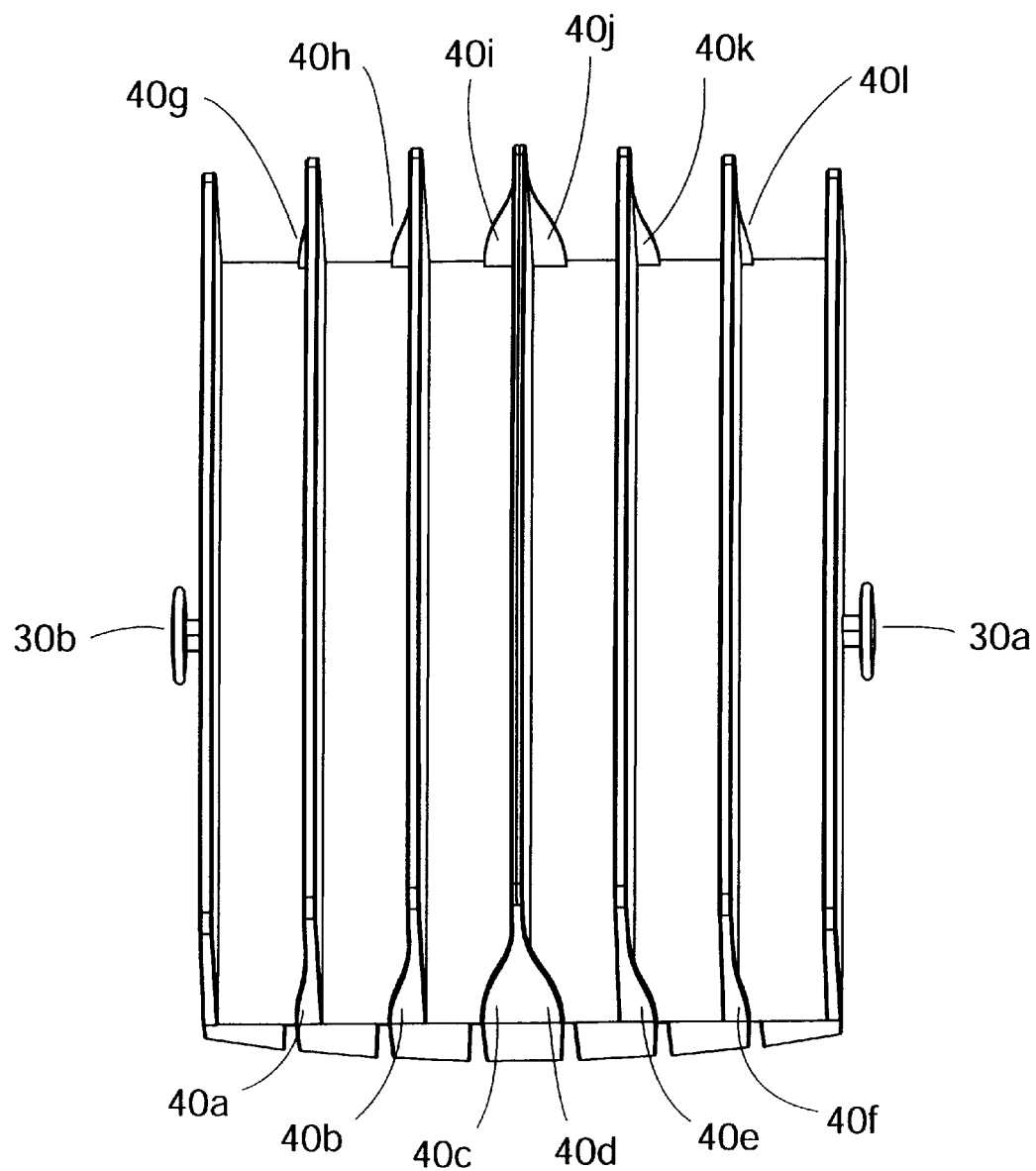
FIG. 9 is a rotated top view of media transport and display device 10, in the unsplayed configuration, without removable storage media 22a–f installed.
Figure 12:
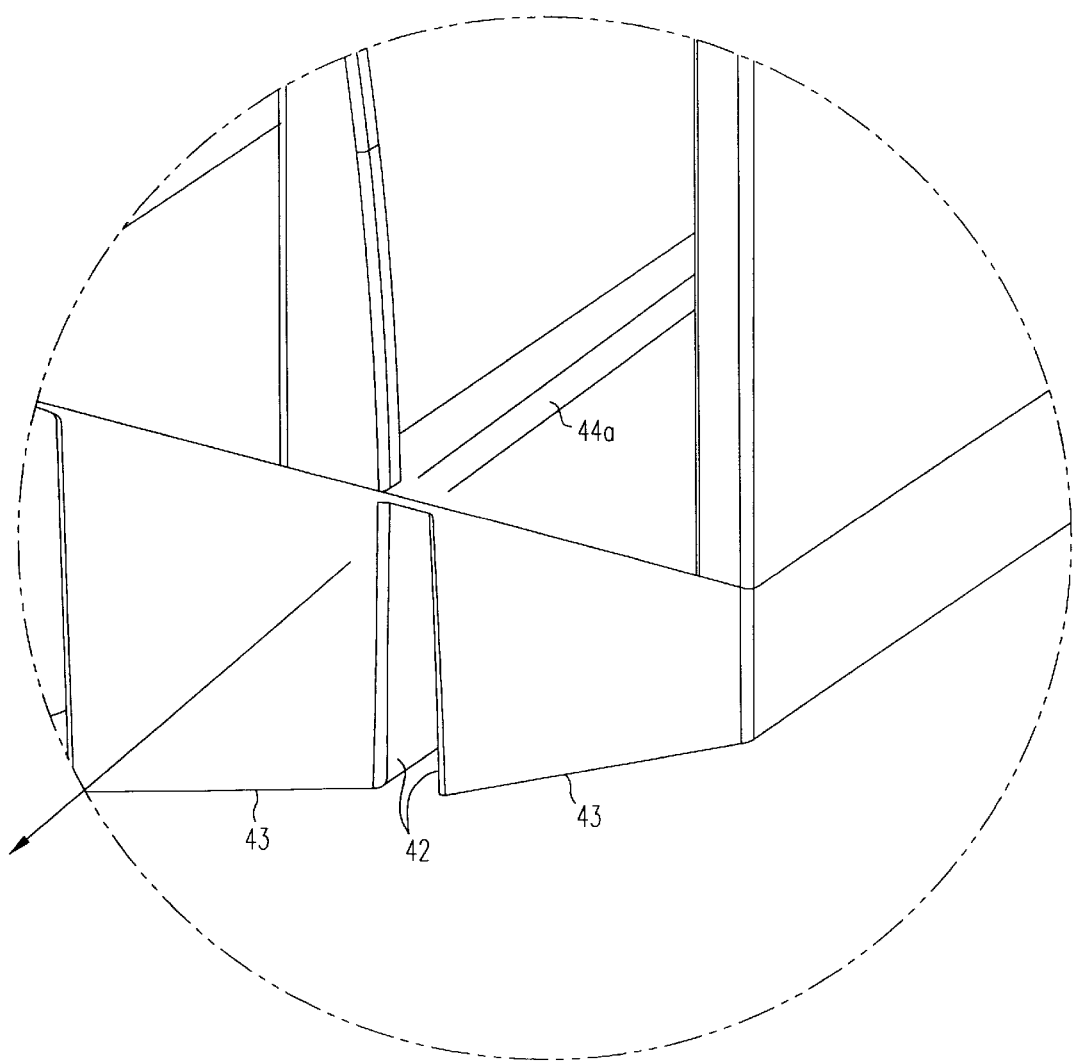
FIG. 12 is an enlarged detail view of plastic flexure 44 on media transport device 10.

FIG. 1 shows the removable storage media transport and display device 10 loaded with removable storage media 22a–f, in the open configuration. FIGS. 8 and 5 shows media transport device 10 without removable storage media 22 installed. Media transport device 10 is a one-piece injection-molded part, molded out of polypropylene plastic, such as Montell 6330 polypropylene, manufactured by Montell Corporation of Wilmington, Del. Referring to FIGS. 4 and 8, media transport device 10 consists of base segments 48a–g, each base segment 48 having a separator fin 34 or an end fin 36 that is a thin substantially planar protrusion, orthogonal to the base segment top surface 52a–f. The purpose of separator fins 34a–e and end fins 36a–b is to provide a surface against which removable storage media 22a–f units are constrained. Referring now to FIG. 9, fin returns 40a–l are located on the outside edges of separator fins 34a–e, on each side of media transport device 10, the purpose of which is to constrain removable storage media 22a–f units from sliding out of media transport device 10 laterally. FIG. 12 is a detail view showing the construction and connections between the base segments 48a–g. Each base segment has a lateral side surface 42 facing the next adjacent base segment and a bottom surface 43. These lateral side surfaces 42 are nearly parallel and spaced apart from one another when the separator fins 34a–e are aligned substantially parallel with one another and the storage media 22a–f are packed closely together. In the embodiment of FIGS. 1–9 and 12, the bottom surface 43 of central base segment 48d is perpendicular to separator fin 34c, and the bottom surfaces of the successive outward base segments 48 are increasingly angled upward so that when the fins 34 are fully splayed, all of the bottom surfaces 43 lie in a common plane as shown in FIGS. 1 and 5, for placement of the device on a flat surface. FIG. 12 also illustrates how base segments 48a–g are connected to one another by a short, thin section of plastic that is a durable plastic flexure 44. Due to the particular material properties of polypropylene plastic, short thin sections of the plastic may be flexed many thousands of times without breakage. This capability is often used to create integral homogeneous hinges and flexures in many products. This property of polypropylene, as well as plastic flexure design, is well known in the art of plastic part design and will not be presented here. However, the result of base segments 48a–g being connected by plastic flexures 44a–f is that base segments 48a–g can rotate with respect to one another on axes of rotation that are coincident with the long dimensions of plastic flexures 44a–f. This axis of rotation is depicted as an arrow in FIG. 12. The combination of any two adjacent base segments 48 connected by plastic flexure 44, with corresponding end fin 36 or separator fins 34 and fin returns 40, comprise a removable storage media slot 26, which is a space for an individual removable storage media 22 unit that constrains removable storage media 22 unit on five sides.

Referring now to FIG. 6 and 7, retaining band 20 is also manufactured by injection-molding, but consists of a thermoplastic elastomer, which is an injection-moldable rubber, such as Dynaflex 2706, manufactured by GLS Corporation of Cary, Ill. Retaining band 20 is designed with a flat, predominantly rectangular cross-section. FIG. 6 illustrates a widening of retaining band 20 in retaining slot 56a–c areas, thereby allowing less stretch in the localized areas of retaining slots 56a–c when retaining band 20 is in tension. FIGS. 2 and 7 show the material at retaining slot 56c of retaining band 20, as extended to provide the user with a gripable portion of retaining band 20 to aid in attaching and detaching retaining slot 56c to and from retaining band button 30a. FIGS. 6 and 7 also show retaining band 20 with raised grip 60 detail on the elongated portion to enhance gripability. Retaining band 20 may also have identifying logos molded into the area that extends across the top of removable storage media 22a–f, when media transport device 10 is in the closed configuration.

As described above, FIGS. 4 and 5 are views of media transport device 10 without removable storage media 22a–f installed but with retaining band 20 attached across the bottom of media transport device 10. FIG. 4 in particular, is a bottom view that shows how retaining band 20 is attached in two places to band retaining buttons 30a and 30b on media transport device 10. Referring now to FIGS. 4 and 6, retaining slot 56a is placed over retaining band button 30a, and retaining slot 56b on retaining band 20 is placed over retaining band button 30b. The size of retaining slots 56a–c is smaller than the size of retaining band buttons 30a–b on media transport device 10, therefore, retaining band 20 is firmly attached to media transport device 10 at two places. Because retaining band 20 is made out of an elastic material, retaining slots 56a–c can be stretched to fit over retaining band buttons 30a–b in the assembly process. The distance between retaining slot 56a and retaining slot 56b on retaining band 20 is shorter than the distance between band retaining button 30a and band retaining button 30b, as measured across the bottom of media transport device 10, even when media transport device 10 is flexed at each plastic flexure 44a–f such that the top of separator fins 34a–e and end fins 36a–b are moved farthest away from one another, and such that each base segment 48a–g is touching the adjacent base segment 48a–g at the bottom of each base segment 48. This state represents the maximum flexed and splayed-open extent of media transport device 10. Stretched retaining band 20 thus imparts a driving force to flex media transport device 10 into the open, splayed position, if retaining slot 56c is not attached to retaining band button 30a on media transport device 10. Likewise, the distance between retaining slot 56b and retaining slot 56c is shorter than the distance between retaining band button 30b and retaining band button 30a, as measured up one side of, across the top, and down the other side of removable media storage units 22a–f that are placed in media transport device 10 when media transport device 10 is closed, as shown in FIG. 2. Therefore, when retaining slot 56c is attached to retaining band button 30a, stretched retaining band 20 exerts a force to keep removable storage media units 22a–f apositioned against respective separator fins 34a–e and end fins 36a–b, and thus media transport devices 10 is in the closed configuration.

The relative relationship, spacing, and size of base segments 48a–g including their lateral surfaces 42 and hinges 44, separator fins 34a–e, end fins 36a–b, and plastic flexures 44a–f determines the angle at which the lower ends of the lateral surfaces of base segments 48a–g stop against each other, and this in turn determines the angle that separator fins 34a–e or end fins 36a–b, and thus removable storage media 22a–f, will attain when media transport device 10 is loaded with removable storage media 22a–f and in the open configuration. In the closed configuration, removable storage media units 22a–f are separated only by separator fins 34a–e. Retaining band 20 is sized so that with even one removable storage media unit 22 installed, retaining band 20 will provide a sufficient tensile load to retain single removable storage media unit 22, placed any of removable storage media slots 26a–f, when retaining slot 56c is attached to band retaining button 30a, and media transport device 10 is in the closed configuration.

The operation of media transport device 10 will now be described. There are two modes of operation in which media transport device 10 takes on two distinct configurations: open and closed. In an initial state, media transport device 10 is in the open configuration as shown in FIG. 5, and contains no removable media storage 22a–f. Retaining slots 56a and 56b are fastened to band retaining buttons 30a and 30b respectively, as described above. Retaining slot 56c is not fastened. Next, as shown in FIGS. 1 and 3, removable storage media 22a–f are placed in removable storage media slots 26 a–f in media transport device 10. The bottom of removable storage media 22a–f resting against base segment top surfaces 52a–g. Due to the angled configuration of separator fins 34a–e and end fins 36a–b, one side of removable media storage 22a–f rests against one side of either separator fins 34a–e, or end fins 36a–b. Removable storage media 22a–f are located centered on media transport device 10, positioned between pairs of fin returns 40a–l corresponding to each separator fin 34a–e. In this state, removable storage media 22a–f are easily viewed and grasped. Removable storage media are also easily removed from or placed into, media transport device 10 due to the large lead-in provided by splayed separator fins 34a–e and end fins 36a–b. Media transport device 10 is maintained in this open configuration by the elastic force of retaining band 20 and by the weight of angled removable storage media 22a–f. It is important to note that the interplay of gravity and the geometry of base segments 48a–g contributes to the splaying open of media transport device 10 when it is in the open configuration. This is best illustrated by observing the difference between media transport device 10 in FIG. 1 and FIG. 2. FIG. 2 shows that base segments 48a–g become successively shorter moving away from the center of media transport device 10. As shown in FIG. 8 and in FIG. 2, in the closed configuration, media transport device 10 rests on base segment 48d, the center segment. When retaining slot 56c is not fastened to band retaining button 30a, the effect of the weight of removable storage media 22a–f causes each of base segments 48a–c and 48e–g to rotate about the axes coincident with plastic flexures 44a–f, subsequently dropping down until the bottom surface of base segments 48a–c and 48e–g are resting on the surface upon which media transport device 10 is sitting.

Media transport device 10 is transitioned to the closed transport mode by grasping media transport device 10 at the outside surface of end fins 36a–b and applying a squeezing force that overcomes the elastic force of retaining band 20 and the weight of gravity of angled removable storage media 22a–f. In practice, the squeezing force required to do this is minimal and is easily exerted by any user. The result is that plastic flexures 44a–f allow for the rotation upward of base segments 48a–g, separator fins 34a–e, end fins 36a–b, and removable storage media 22a–f until no more rotation is possible due to removable storage media 22a–f being in contact with separator fins 34a–e and end fins 36a–b. Finally, the end of retaining band 20 between retaining slots 56b and 56c is stretched over and around removable storage media 22a–f and retaining slot 56c is fastened to band retaining button 30a. Media transport device is shown in this closed configuration in FIG. 2.

Figure 13:
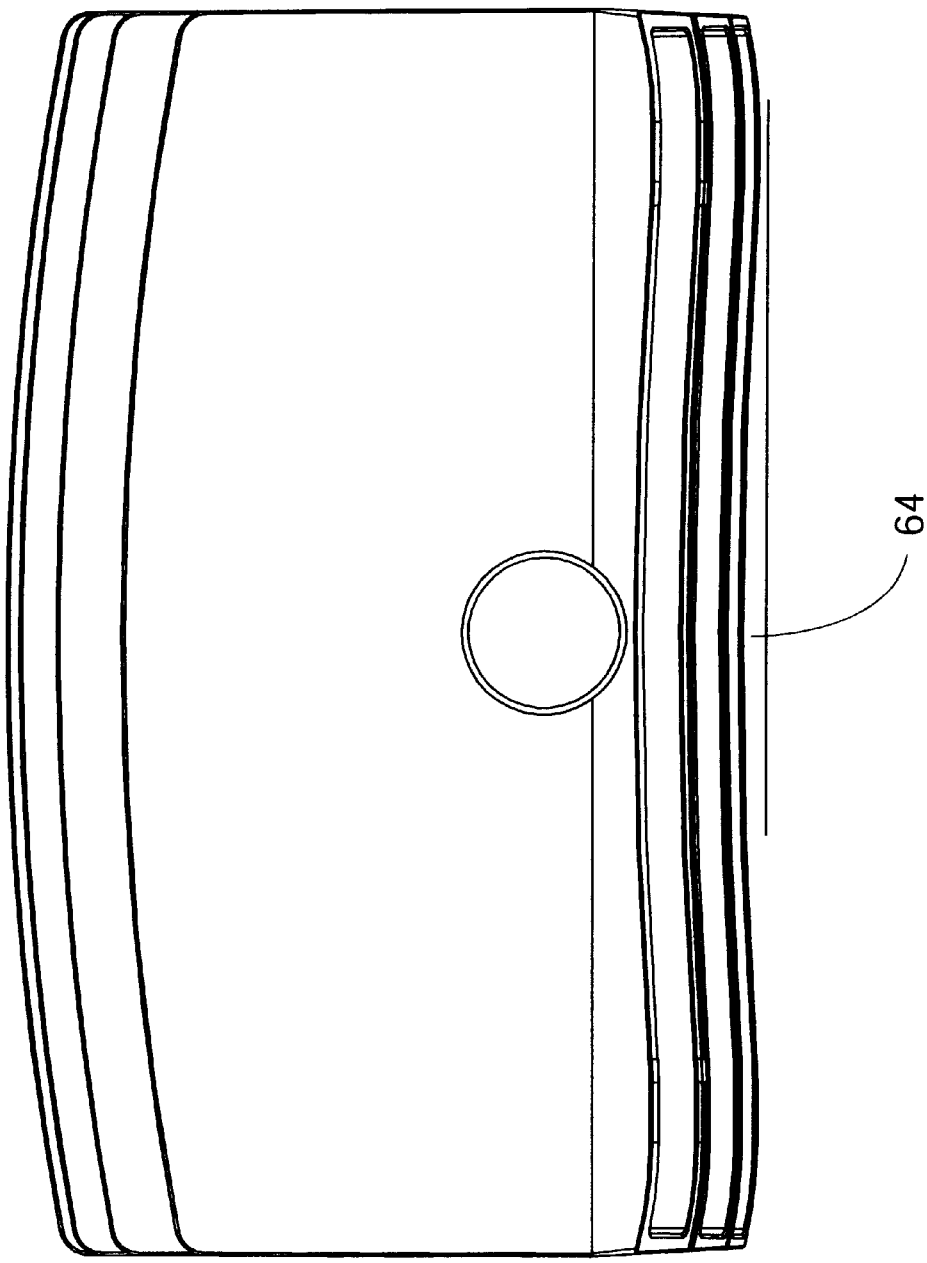
FIG. 13 is an end orthographic view of media transport device 10 showing the band clearance gap 64.

Referring now to FIG. 13, an end view of media transport device 10 is shown with a profile on the bottom of base segments 48a–g curving upward away from the surface upon which media transport device 10 may be sitting, creating a band clearance gap 64. When media transport device 10 is in the closed configuration, band clearance gap 64 serves the function of allowing retaining band 20 to be recessed so that retaining band 20 does not contact any surface upon which media transport device might be sitting. Band clearance gap 64 may be of a dimension such that there is slight contact between retaining band 20 and the surface upon which media transport device 10 is placed, providing minimal non-skid contact. The dimension of band clearance gap 64 is slightly reduced at the two end base segments 48a and 48g, such that when media transport device 10 is in the open configuration, band clearance gap 64 is slightly smaller in dimension than the thickness of retaining band 20. As a result, at the point where retaining band 20 passes over the outermost edge of base segments 48a and 48g, retaining band 20 is in contact with both base segments 48a and 48g, and with the surface upon which media transport device 10 is sitting. Because retaining band 20 is made out of an elastomeric material, a higher friction, non-skid effect is produced.

Figure 14:
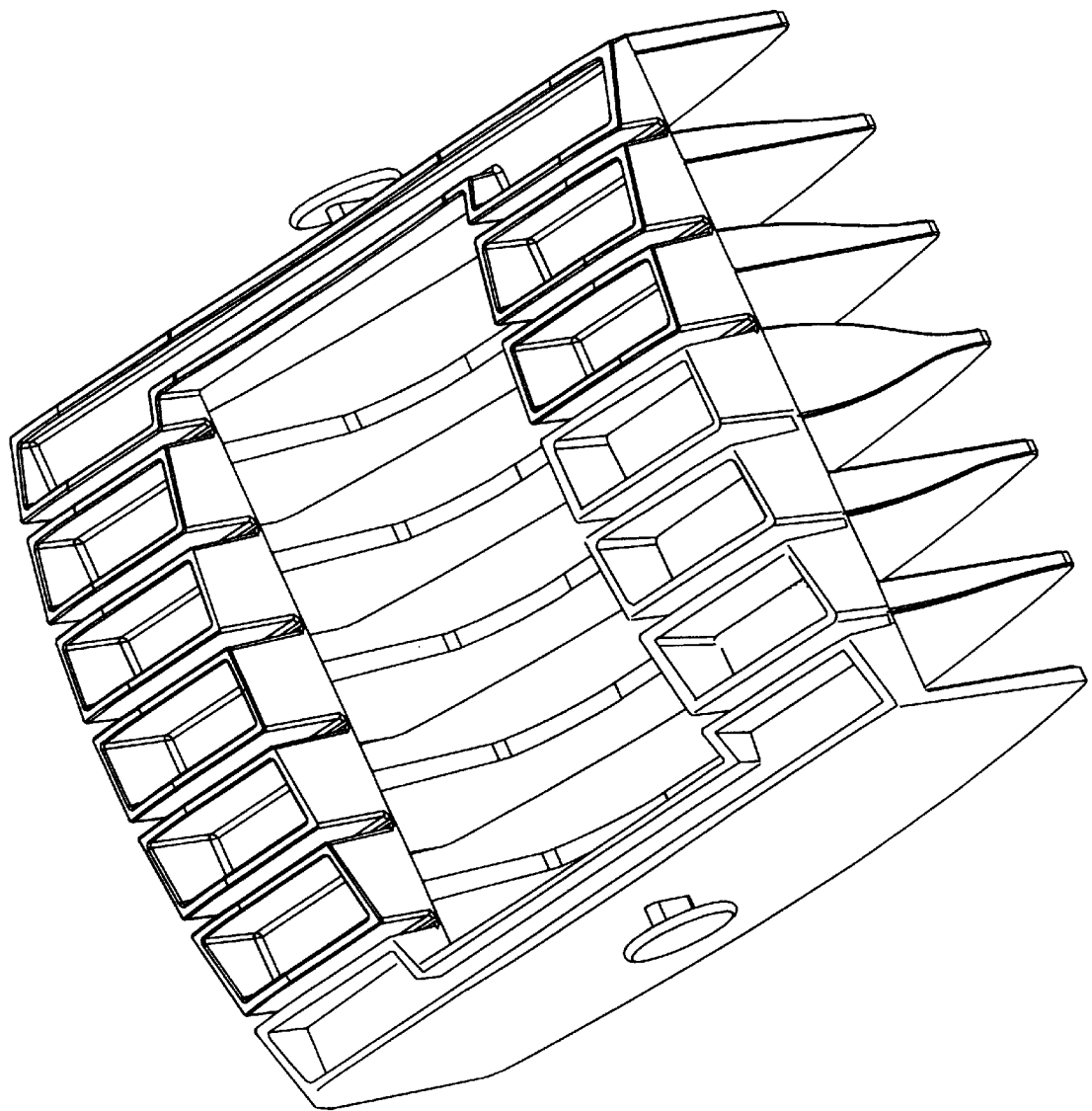
FIG. 14 is an isometric view of the underside of media transport device 10 showing the center core of the part removed.

FIG. 14 shows how media transport device 10 may be molded with a large section of the center removed. Removing this center section of media transport device 10 provides many benefits. First, less plastic is used, reducing the material costs. Second, because there is less surface area of separator fins 34a–e, the part is easier to eject from the injection mold. Third, plastic flexures 44a–f that act as hinges may be made thicker and are thus more robust. Yet, because there is less plastic flexure 44a–f length, plastic flexures 44a–f are not too stiff to be bent by the elastic force of retaining band 20 and the weight of removable storage media 22a–f.

Figure 15:
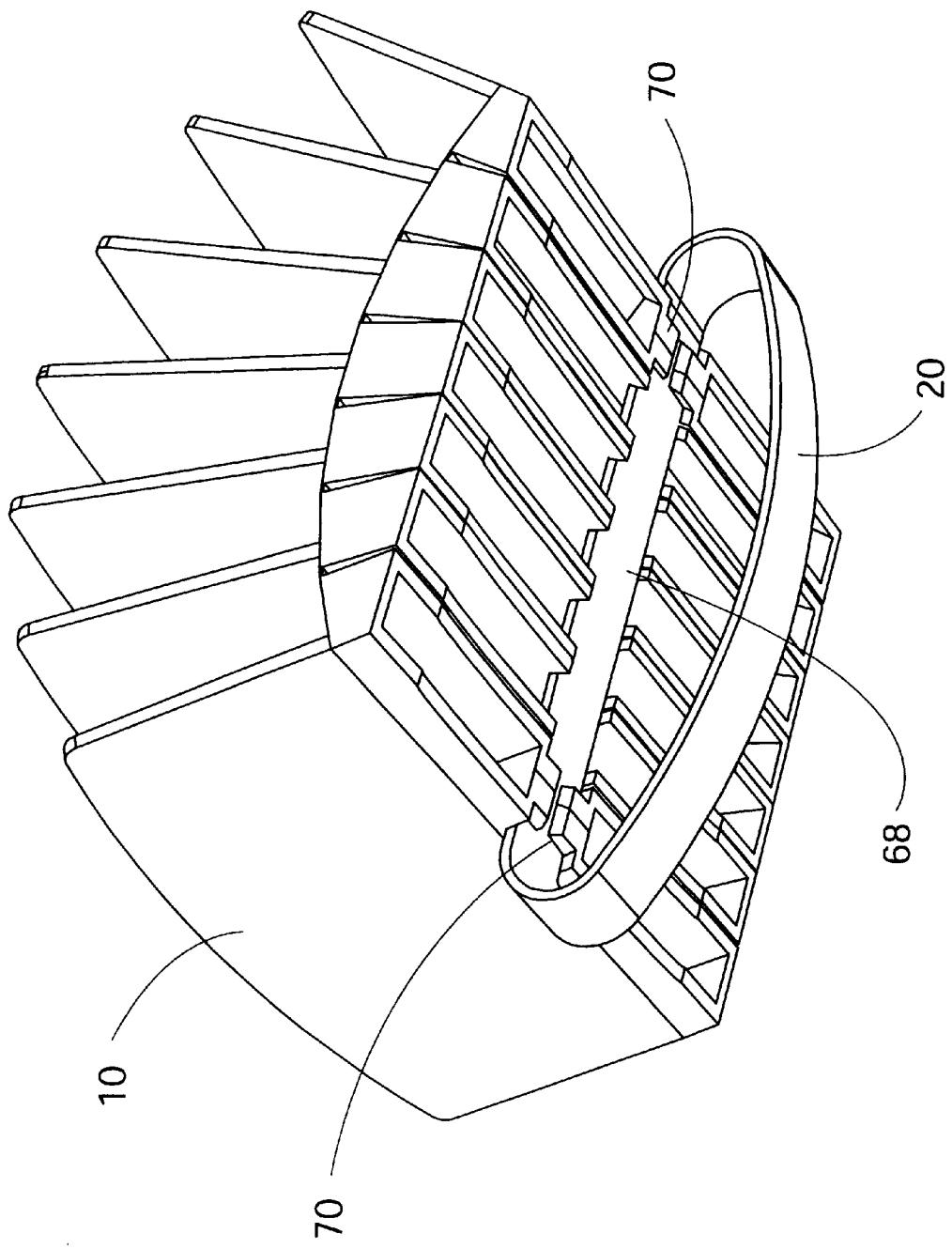
FIG. 15 is an isometric bottom view of the underside of media transport device 10 showing an integral band slot.

FIG. 15 shows media transport device 10 designed to work with a conventional one-piece rubber band as retaining band 20. Media transport device 10 is molded with a retaining band notch 68 that extends across the bottom of base segments 48a–g. At the end base segments 48a and 48g, band catches 70 are molded in so as to capture retaining band 20.

Figure 10:
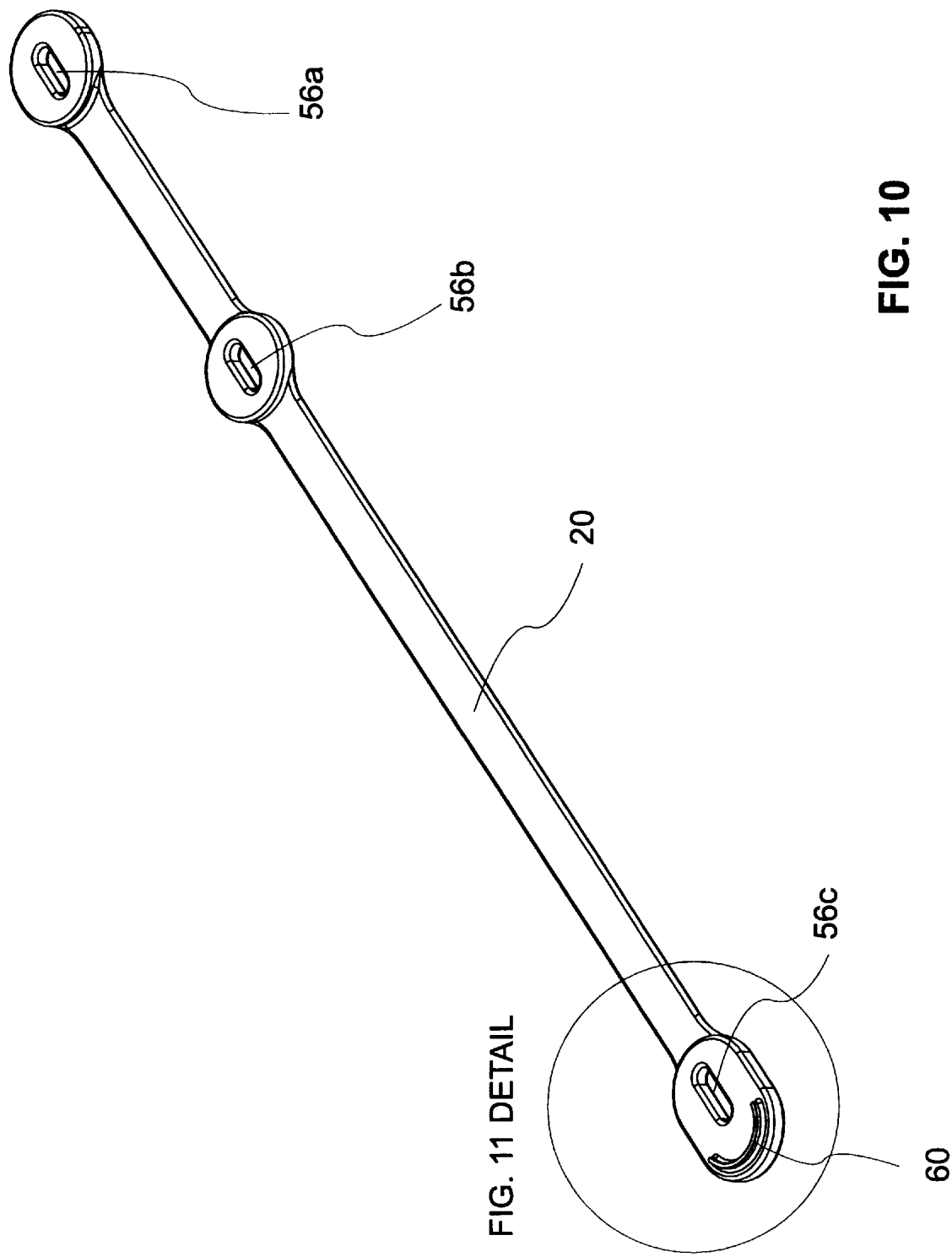
FIG. 10 is an isometric view of an alternative design for retaining band 20.
Figure 11:
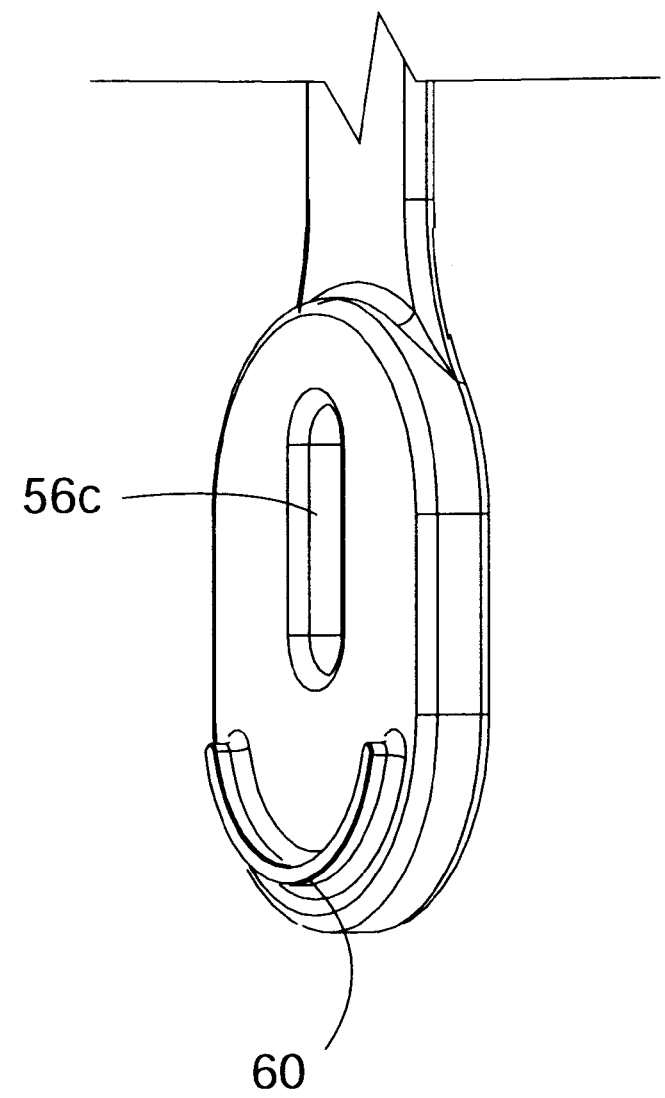
FIG. 11 is a cutaway detail view of retaining slot 56c end of an alternative design for retaining band.

FIGS. 10 and 11 show retaining band 20 with the material thickness in the retaining slot 56a–c areas being greater than that of the band in the areas between retaining slots 56a–c, thus increasing the stiffness of the material in the slotted areas.

SUMMARY, RAMIFICATIONS, AND SCOPE

As described on the basis of the preferred embodiment, and, in comparison with the conventional art, the removable storage media transport and display device of the present invention achieves dramatic improvements in function and safety as follows:

Removable storage media can be transported in a compact and secure way, but when the user wants to access the removable storage media, it can also be deployed in a way so the user can clearly see the media and have easy access to removing the media.

Removable storage media can quickly be transformed from a space efficient transport mode to a splayed, presentation mode, simply by removing a retaining strap.

When the transport and display device is in the open position, the removable storage media is presented in an easy to grasp format while still residing in the transport and display device.

Removable storage media can be quickly and easily placed in their storage slots in the transport and display device because the storage slots open up to provide a larger target, when the device is in the splayed, display mode.

Removable storage cartridges and disks can be maintained in their respective original removable storage cases in both the transport and display modes, when installed in the transport and display device. Keeping the original cases allows the user to retain and view the original artwork or labels.

Individual removable storage media units can be removed from the transport and display device with the removable storage media cartridges or disks maintained in their protective jewel cases with labels.

Individual removable storage media units can be removed or installed in the transport and display device without grasping, handling, or picking up the whole apparatus because the slots open up and apply no friction on the removable storage media in the open mode.

The retaining band provides a positive and secure binding of the removable storage media in the transport and display device, in the closed mode.

Because the transport and display device minimally encompasses the jewel cases even in the closed, transport mode, the user can readily see which removable storage media are contained in the device.

The transport and display device is comprised of only two injection-molded parts, so it is inexpensive to manufacture and easy to assemble.

With minimal changes in dimensions, the design of the transport and display device can fit many different size standards of removable storage media.

Although the description above contains many specificities, these should not be construed as limiting the scope of the invention, but merely providing illustration of some of the presently preferred embodiments of this invention.

Figure 16:
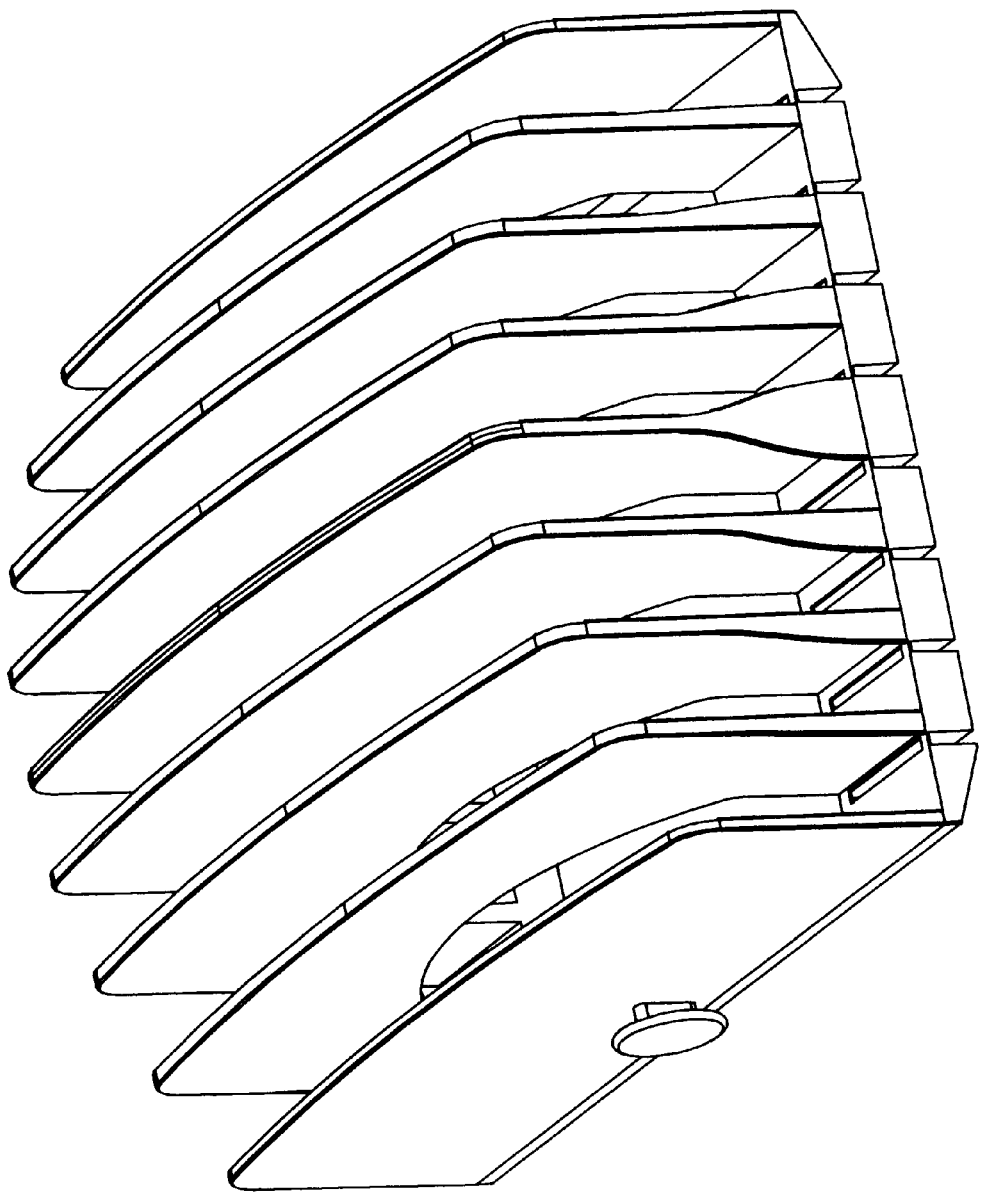
FIG. 16 is an isometric view of media transport device in the closed position with base segments 48 that are even with each other.
Figure 17:
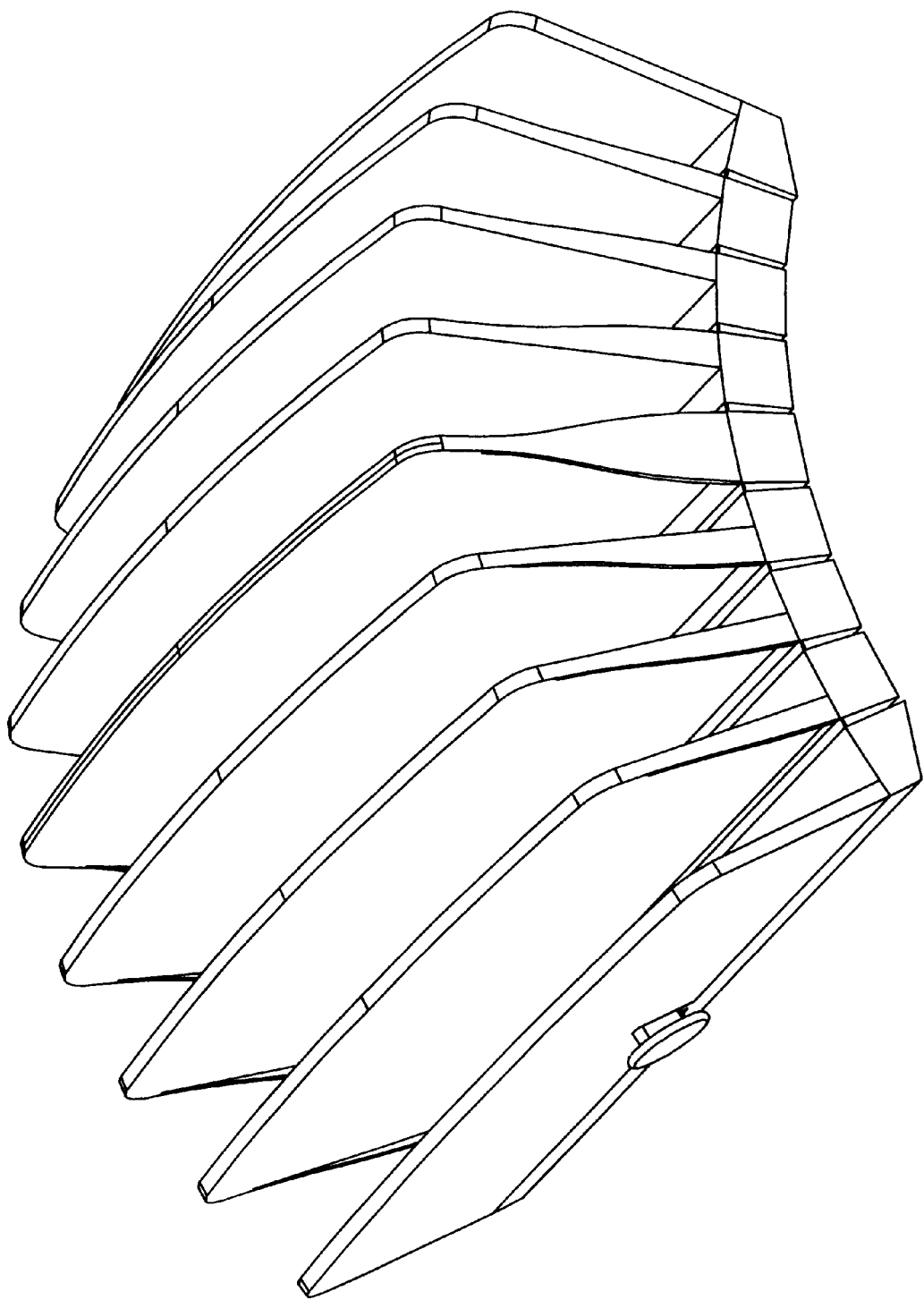
FIG. 17 is an isometric view of media transport device 10 with base segments 48 that form an arc in the open configuration.
Figure 18:
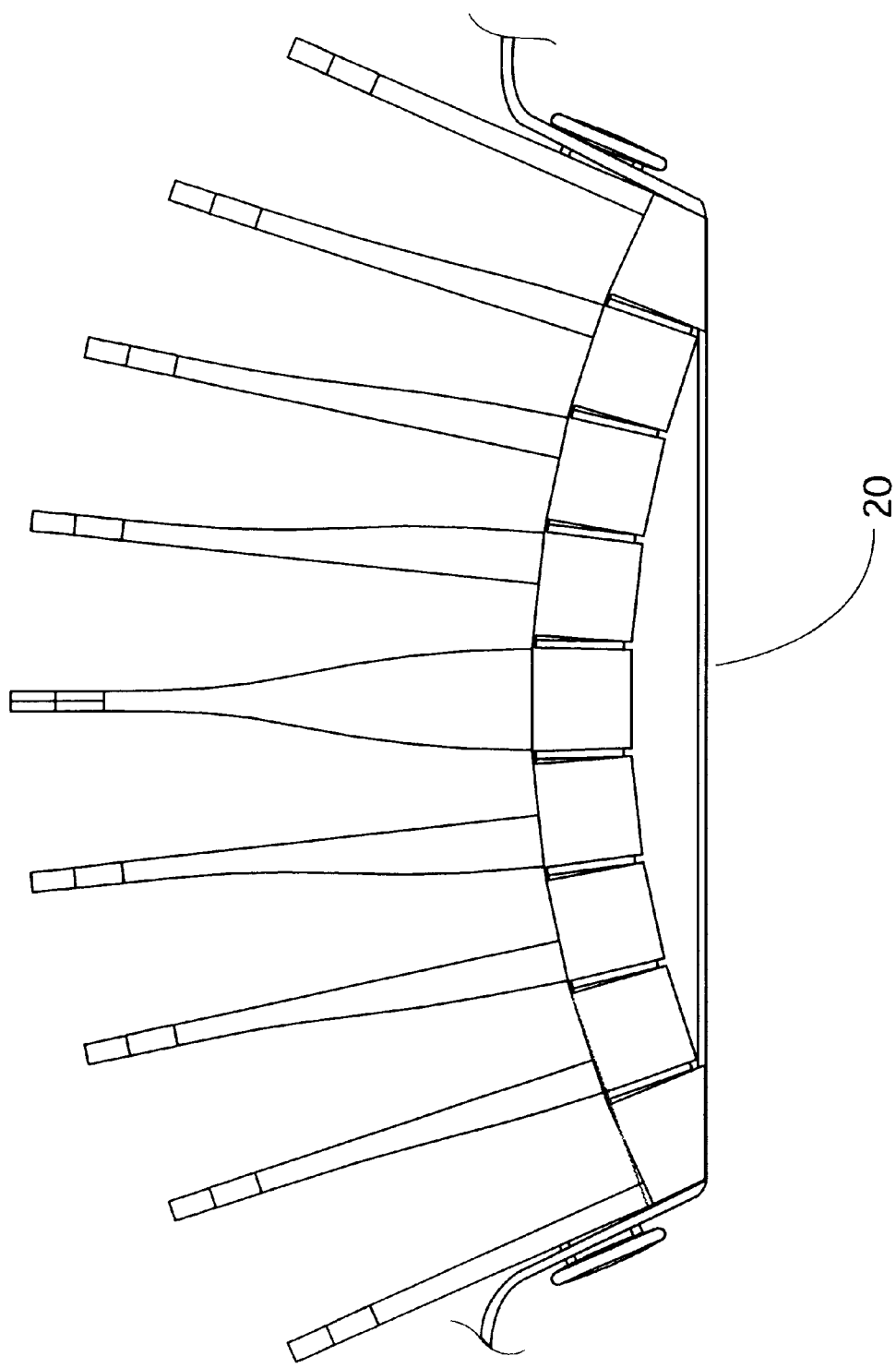
FIG. 18 is an orthographic side view of media transport device 10 with base segments 48 that form an arc in the open configuration.

The present invention could be made in a variety of configurations. Small changes in the width, length, and pitch of base segments 48a–g and separator fins 34a–e would allow media transport device 10 to contain various types and sizes of media. For example, media transport devices 10 would be designed to fit Zip removable storage media, CD removable storage cases, or Superdisk removable storage media. The number of media devices accommodated by such a device can vary by changing the number of base sections in the unit; this number may range from two to as many sections as reasonably can be manufactured. Additionally, units could be attached together to form larger units. Depending on the thickness of the media device in question, an optimal balance between overall size and storage capacity will dictate the number of media devices to be contained; thus, should such a device be made for floppy discs, as many as twenty or more could be accommodated by the design. The hinges between the base segments could be mechanical rather than integral; that is, the base segments could be molded separately and snapped together. In another embodiment of the present invention, media transport device may be manufactured without fin returns 40a–b. In this design, media transport device 10 could be narrower in width than removable media storage 22a–f units, so various width removable media storage units could be used with the same media transport device 10. Separator fins 34a–e could also be taller or shorter than those indicated in the preferred embodiment. FIGS. 16, 17, and 18 show how the geometry of base segments 48 could be such that the bottom surfaces of base segments are substantially planar when media transport device 10 is in the closed position. In such an embodiment, media transport device 10 relies more on the elastic force of retaining band 20 to open into the splayed open configuration. However, in this embodiment, media transport device 10 has a larger flat area as a base when in the closed configuration. Retaining band 20 could also be made of elastic, Velcro (or other comparable hook and loop fastener), or fabric with an attached fastener. Alternately, retaining band 20 could be comprised of a spring or a sprung metal member. Media transport device 10 could also be made predominantly or entirely of fabric, with retaining band 20 made in any of the above disclosed fashions. In such a configuration, the geometry that causes the splay action is not necessarily the geometry of the bottom of the case, but instead could be the shape of the individual pockets that receive the media devices. The present invention could also be made entirely of rubber or other elastomeric material, such that media transport device 10 and retaining band 20 could be integrally formed as one piece.

It is to be understood that the present invention, as disclosed above in preferred and alternate embodiments, is not limited to the specific configurations described and illustrated. Any combination of components herein described, or their replacement with comparable components, falls within the scope of this invention.

We claim:

1. A media transport and display device comprising:
   a plurality of spaced apart base segments with adjacent base segments having facing lateral side surfaces and bottom surfaces and connected together at their upper ends by a hinging means,
   each base segment having a substantially vertical planar fin for holding between said fins a plurality of removable storage media placed on said base segments and against said vertical planar fins, the lower ends of said lateral side surfaces of adjacent base segments being spaced apart when said planar fins are parallel to one another, and
   a retaining band connected to the outermost base segments for automatically rotating the base segments and removable storage media between said fins in a splayed form and for alternately retaining the lower ends of said base segments spaced apart and removable storage media between fins in a compressed form.

2. The media and transport device of claim 1 wherein said retaining band includes a first portion connected to said outermost base segments for rotating said base segments so the lower ends of said lateral side surfaces of adjacent base segments contact one another for positioning said planar fins in splayed form.

3. The media and transport device of claim 2 wherein said retaining band is elastic.

4. The media and transport device of claim 2 including retaining buttons on the outer surfaces of said outermost fins and said first portion of said retaining band extending between said buttons under the bottom of said base segments.

5. The media and transport device of claim 4 wherein said retaining band is elastic.

6. The media and transport device of claim 4 wherein said retaining band includes a second portion connectable to said buttons while extending over the top of said fins and removable storage media positioned there between to compress said fins and removable storage media together in substantially compressed form.

7. The media and transport device of claim 1 wherein the bottom surface of the centermost of said base segments is substantially perpendicular to said planar fin thereof and the bottom surfaces of the successive outer base segments are increasingly angled upward so that when said fins are splayed all of said bottom surfaces lie in a common plane.

8. The media and transport device of claim 1 wherein the bottom surfaces of each of said base segments is substantially perpendicular to said planar fin thereof.

9. The media and transport device of claim 1 being a one piece, integral member.

10. A media transport and display device comprising:
    a plurality of fins forming slots for accepting removable storage media,
    said fins being capable of opening to expand said slots at the top end thereof for the purpose of convenient placement of removable storage media into said slots,
    said fins also being capable of contracting to compress a plurality of removable storage media to a substantially parallel configuration, and
    each of said fins connected to one of a plurality of base segments with adjacent base segments having facing lateral side surfaces and bottom surfaces and connected together at their top surfaces by a hinging means, the lower ends of said lateral side surfaces of adjacent base segments being spaced apart when said fins are moved to contract the slots, the space between the lower ends of said lateral side surfaces of adjacent base segments being reduced as said fins move to open said slots and limiting movement of said fins when the lower ends of said lateral side surfaces of adjacent base segments contact one another.

11. The media transport and display device of claim 10 including means for automatically compressing the lower ends of said base members into contact with one another for expanding said display device into a splayed format.

12. The media transport and display device of claim 11 including means for retaining said display device in compressed form with said fins and storage media contained there between in substantially parallel configuration.

13. The media transport an display device of claim 10 including fastening means on the outside surface of the outermost fins and an elastic band having a first portion connected to said fastening means and extending under the bottom of said base segments to compress the lower ends of the base segments lateral side surfaces to splay the fins and storage media contained in said slots.

14. The media and transport display device of claim 13 wherein said retaining band includes a second portion connectable to said attaching means while extending over the top of said fins and removable storage media positioned in said slots to compress said fins and the removable storage media together in a substantially compressed form.

15. The media and transport device of claim 10 wherein the bottom surface of the centermost of said base segments is substantially perpendicular to the planar fin thereof and the bottom surfaces of the successive outward base segments are increasingly angled upward so that when said fins are splayed all of said bottom surfaces lie in a common plane.

16. The media and transport device of claim 10 wherein the bottom surfaces of said base segments are substantially perpendicular to the planar fins thereof.

17. A media transport and display device comprising:
    a plurality of spaced apart base segments with adjacent base segments having facing lateral side surfaces and bottom surfaces and connected together at their upper ends by a hinging means,
    each base segment having a substantially vertical planar fin for holding removable storage media between said fins,
    a plurality of removable storage media placed on said base segments and between said vertical planar fins, the lower ends of said lateral side surfaces of adjacent base segments being spaced apart when said planar fins and said removable storage media are parallel to one another, and
    a retaining band connected to the outermost base segments for automatically rotating the base segments, said removable storage media and said fins in a splayed form and for alternately retaining the lower ends of said base segments spaced apart and said removable storage media and said fins in a compressed form.

18. The media and transport device of claim 17 wherein said retaining band includes a first portion connected to said outermost base segments for rotating said base segments so the lower ends of said lateral side surfaces of adjacent base segments contact one another for positioning said removable storage media and said planar fins in splayed form.

19. The media and transport device of claim 18 wherein said retaining band includes a second portion connectable to said outermost base segments while extending over the top of said fins and said removable storage media positioned there between to compress said fins and said removable storage media together in substantially compressed form.

* * * * *